(12) United States Patent
Liu et al.

(10) Patent No.: US 12,196,898 B2
(45) Date of Patent: Jan. 14, 2025

(54) SIGNAL PROCESSING SYSTEM AND METHOD FOR RADIATION DETECTOR BASED ON METAL OXIDE SEMICONDUCTOR (MOS) TRANSISTOR

(71) Applicants: Institute of Radiation Medicine Chinese Academy of Medical Sciences, Tianjin (CN); Tianjin Huafang Technology Co., Ltd., Tianjin (CN); Harbin Engineering University, Yantai Research Institute, Yantai (CN); Tianjin Eco-Environmental Monitoring Center, Tianjin (CN)

(72) Inventors: Qiang Liu, Tianjin (CN); Zhenhua Lin, Tianjin (CN); Jinhan Wang, Tianjin (CN); Kunliang Yao, Tianjin (CN); Yudong Luo, Tianjin (CN); Sheng Wu, Tianjin (CN); Yongjie Wang, Tianjin (CN); Jianzheng Gao, Tianjin (CN); Ming Cui, Tianjin (CN)

(73) Assignees: INSTITUTE OF RADIATION MEDICINE CHINESE ACADEMY OF MEDICAL SCIENCES, Tianjin (CN); TIANJIN HUAFANG TECHNOLOGY CO., LTD., Tianjin (CN); HARBIN ENGINEERING UNIVERSITY, YANTAI RESEARCH INSTITUTE, Yantai (CN); TIANJIN ECO-ENVIRONMENTAL MONITORING CENTER, Tianjin (CN)

( * ) Notice: Subject to any disclaimer, the term of this patent is extended or adjusted under 35 U.S.C. 154(b) by 260 days.

(21) Appl. No.: 18/150,159

(22) Filed: Jan. 4, 2023

(65) Prior Publication Data
US 2024/0077626 A1 Mar. 7, 2024

(30) Foreign Application Priority Data

Sep. 5, 2022 (CN) .......................... 202211095140.2
Sep. 26, 2022 (CN) .......................... 202211175982.9

(51) Int. Cl.
*G01T 1/24* (2006.01)
(52) U.S. Cl.
CPC .................................... *G01T 1/247* (2013.01)
(58) Field of Classification Search
CPC ........... G01T 1/247; G01T 1/17; G01T 1/175; G01T 1/208
See application file for complete search history.

(56) References Cited

U.S. PATENT DOCUMENTS 5,990,745 A * 11/1999 Carroll .................. G06G 7/184
330/277

OTHER PUBLICATIONS

Hu, K., et al. "A low noise front end electronics for micro-channel plate detector with wedge and strip anode." Journal of Instrumentation 11.03 (2016): T03002. (Year: 2016).*

* cited by examiner

*Primary Examiner* — Edwin C Gunberg
*Assistant Examiner* — Richard O Toohey
(74) *Attorney, Agent, or Firm* — Kinney & Lange, P.A.

(57) ABSTRACT

A signal processing system and method for a radiation detector based on a metal oxide semiconductor (MOS) transistor are disclosed. The signal processing system includes a power supply generation module, an analog signal processing module, and a digital signal acquiring-processing module. The power supply generation module provides a novel power supply method, and converts a positive high voltage power supply into a negative high voltage power supply to supply power to a last dynode of a photomultiplier tube (PMT). The analog signal processing (Continued)

module converts a negative current pulse signal into a voltage difference signal. The digital signal acquiring-processing module acquires a signal of the analog signal processing module, and converts the signal into a digital signal for identification.

6 Claims, 12 Drawing Sheets

As shown in FIG. 8, the integral amplifier circuit collects charges in the current pulse signal i(t) of the detector to form a preliminarily amplified voltage signal V1o(t)

As can be seen from FIG. 8, the falling edge of the waveform of the V1o(t) is very slow, and the signal is piled up obviously even in case of a low counting rate. In order to accelerate attenuation of the signal, the pole-zero cancellation circuit is sampled, such that the signal V2o(t) has an appropriate tailing.

The second pole-zero cancellation circuit and the filter forming circuit are formed into a CR-(RC)$^2$ filter forming network. A two-stage second-order Sallen-key low-pass filter and a one-stage amplifier structure are used by the filter forming circuit. Through the filter forming circuit, the signal V2o(t) is subjected to noise filtering and signal forming. As a result, the signal is modulated as a quasi-Gaussian waveform with a flat top, an appropriate width and a good signal-to-noise ratio (SNR).

FIG. 10

SIGNAL PROCESSING SYSTEM AND METHOD FOR RADIATION DETECTOR BASED ON METAL OXIDE SEMICONDUCTOR (MOS) TRANSISTOR

CROSS REFERENCE TO RELATED APPLICATION(S)

This patent application claims the benefit and priority of:
Chinese Patent Application No. 202211095140.2, filed with the China National Intellectual Property Administration on Sep. 5, 2022; and
Chinese Patent Application No. 202211175982.9, filed with the China National Intellectual Property Administration on Sep. 26, 2022,
the disclosures of which are incorporated by reference herein in their entireties as part of the present applications.

TECHNICAL FIELD

The present disclosure relates to the technical field of nuclear electronics, and in particular to a signal processing system and method for a radiation detector based on a metal oxide semiconductor (MOS) transistor.

BACKGROUND

With applications of microelectronic techniques in the field of nuclear electronics, and particularly with applications of application specific integrated circuit (ASIC) techniques, nuclear electronic techniques have been stepped into a new stage, namely readout chips. Specifically, all functions can be completely realized in a customized chip. Nuclear signal measurement falls into a scope of weak signal detection. According to the Friis equation, a pre-amplifier serves as a first-stage amplifier of a nuclear radiation measurement system, and its noise performance determines a resolution of front-end electronic detection. In other words, an amplitude of noise of the pre-amplifier directly determines an intensity of signal detected by the whole nuclear radiation measurement system. Hence, a low-noise pre-amplifier is of great importance to the nuclear electronics and particularly the front-end nuclear electronics. In addition, nuclear electronic techniques based on analog signal processing are generally implemented by means of complicated analog circuits. With the ever-increasing development of digital signal processing techniques and semiconductor techniques, analog-to-digital converter (ADC) techniques are gaining a rapid development with better performance indicators, and nuclear electronic techniques based on analog signal processing are put on the agenda. Currently, the structure of nuclear electronic circuits based on modern digital signal processing is basically an architecture of a front-end electronic system (a pre-amplifier circuit, a pole-zero cancellation circuit, a filter forming circuit and the like are required) and an ADC. Therefore, the low-noise front-end electronic system and high-speed data acquisition are two development trends of the future nuclear electronics.

A classic nuclear electronic circuit mainly includes a pre-amplifier, a spectroscope amplifier, a multichannel analyzer, and the like, which involves complicated operation, noise and inevitable ballistic deficit in signal processing. FIG. 8 illustrates a signal processing circuit of a classic nuclear electronic circuit and a signal waveform in a related process.

Physical characteristics of a radiation sensor are described by generating an integral of a current source over time, in which generated charges are directly proportional to energy of particles entering a detector. When the classic nuclear electronic circuit generates the integral of the current source over the time, charges are often accumulated to an integrating capacitor, and accumulated charges are discharged with a large discharge resistor. However, since the discharge resistor has a large and fixed resistance, it is possible to cause pulse pile-up when many rays enter a detected material at the same time, namely only pulses of the particles at a certain frequency are allowed, and the ballistic deficit occurs.

The scintillation radiation detector has a following working principle. The scintillation material emits photons after absorbing radiation energy. With a photomultiplier tube (PMT), the photons are converted into electrons and the electrons are multiplied enormously at a constant factor. The radiation detector outputs a current pulse signal having charges directly proportional to the radiation energy. The signal processing method for the classic radiation detector is implemented by integrating and amplifying the current pulse signal with a resistor-capacitor (RC) integrator circuit and an amplifier circuit at the pre-amplifier. In view of an exponential discharge coefficient of the resistor in the RC integrator circuit, there is a serious tailing in a waveform of the voltage signal that is very likely to cause the pulse pile-up and the inevitable ballistic deficit. Therefore, a series of shaping filter circuits are used to correct the waveform of the voltage signal in the signal processing method for the classic radiation detector. In view of electronic noise of the shaping filter circuits, a signal processing system for the classic radiation detector is designed complicatedly.

SUMMARY

In view of defects in the prior art, an objective of the present disclosure is to provide a signal processing system and method for a radiation detector based on an MOS transistor. The present disclosure solves problems of noise caused by use of a coupling capacitor for separating a positive high-voltage power supply from an output signal of a detector in the positive high-voltage power supply mode, ballistic deficit in the conventional nuclear electronic circuit, baseline shift, and noise in a complicated signal processing circuit.

To achieve the above objective, the present disclosure provides the following technical solutions:

A signal processing system for a radiation detector based on an MOS transistor includes a PMT, a power supply generation module, an analog signal processing module, and a digital signal acquiring-processing module, where
the PMT includes a cathode K, an anode P, dynodes, and a voltage-divider circuit;
the power supply generation module includes an external power supply, a first regulator, a second regulator, a third regulator, a fourth regulator, a booster circuit, a shaping filter circuit, and a power isolation module;
the external power supply is connected to the first regulator, and regulated by the first regulator to obtain a first direct-current (DC) voltage power supply;
the first DC voltage power supply is connected to the second regulator, and regulated by the second regulator to obtain a second DC voltage power supply;
the first DC voltage power supply is connected to the power isolation module, to generate a first isolating DC voltage power supply;

the first isolating DC voltage power supply is connected to the third regulator, and regulated by the third regulator to obtain a second modular power supply;

the first isolating DC voltage power supply is connected to the fourth regulator, and regulated by the fourth regulator to obtain a third modular power supply;

the first DC voltage power supply passes through the booster circuit and the shaping filter circuit to generate a positive high-voltage power supply;

an anode of the positive high-voltage power supply generated by the first DC voltage power supply is connected to a ground of the first isolating DC voltage power supply, to convert the positive high-voltage power supply into a negative high-voltage power supply;

the negative high-voltage power supply is connected to a last dynode DY8 of the PMT, to provide a voltage required by the dynode, and a ground of the first DC voltage power supply is connected to the cathode K of the PMT;

the power isolation module comprises a power isolator;

the power isolator is configured to isolate a ground of a 5 V DC power supply and a 5 V isolating DC power supply;

the analog signal processing module includes an MOS transistor, a first capacitor, and an amplifier;

the MOS transistor Q1 includes a second pin connected to an anode of the power supply VDDA, and a third pin connected to the amplifier; the first capacitor is connected between the second pin and the third pin of the MOS transistor Q1 in parallel; and a negative current pulse signal is accessed to the third pin of the Q1;

the first capacitor is charged under control of the MOS transistor Q1; by passing different negative current pulse signals through the first capacitor, the first capacitor is discharged to obtain a voltage drop, thereby obtaining a voltage difference signal; and the voltage difference signal is amplified to obtain an amplified voltage difference;

the digital signal acquiring-processing module includes a chip and a digital isolator; and the chip is connected to the amplifier and the digital isolator, and configured to acquire an analog voltage difference signal, convert the analog signal into a digital signal and process the digital signal for final data transmission.

Preferably, the chip includes a PeakClear output signal; and the PeakClear output signal is accessed to a thirteenth pin of the chip; and the PeakClear output signal is accessed to a first pin of the MOS transistor Q1 to control connection of the MOS transistor Q1 so as to charge the first capacitor.

Preferably, second and third pins of the digital isolator are respectively connected to twentieth and nineteenth pins of the chip; and the digital isolator includes an eighth pin connected to the first DC voltage power supply, a first pin connected to the third modular power supply, a fifth pin connected to a ground of the first DC voltage power supply, and a fourth pin connected to the ground of the first isolating DC voltage power supply, and is configured to isolate the ground of the first DC voltage power supply and the ground of the first isolating DC voltage power supply to facilitate the stable data transmission.

Preferably, the booster circuit includes a transformer and a converter; and both the transformer and the converter are connected to the first DC voltage power supply, and configured to convert and boost the first DC voltage power supply.

Preferably, the second modular power supply supplies power to the analog signal processing module; and the third modular power supply is a 3V3 power supply, and supplies power to the digital signal acquiring-processing module.

A signal processing method for a radiation detector based on an MOS transistor includes:

regulating an external power supply by a first regulator to obtain a first DC voltage power supply;

regulating the first DC voltage power supply by a second regulator to obtain a second DC voltage power supply;

connecting the first DC voltage power supply to a power isolation module to generate a first isolating DC voltage power supply;

regulating the first isolating DC voltage power supply by a third regulator to obtain a second modular power supply;

regulating the first isolating DC voltage power supply by a fourth regulator to obtain a third modular power supply;

passing the first DC voltage power supply through a booster circuit and a shaping filter circuit to generate a positive high-voltage power supply;

connecting an anode of the positive high-voltage power supply generated by the first DC voltage power supply to a ground of the first isolating DC voltage power supply, to convert the positive high-voltage power supply into a negative high-voltage power supply;

connecting the negative high-voltage power supply to a last dynode DY8 of a PMT, to provide a voltage required by the dynode;

isolating a ground of a 5 V DC power supply and a ground of a 5 V isolating DC power supply by a power isolator;

charging a first capacitor under control of an MOS transistor Q1, discharging the first capacitor by passing different negative current pulse signals through the first capacitor to obtain a voltage drop, thereby obtaining a voltage difference signal, and amplifying the voltage difference to obtain an amplified voltage difference; and acquiring an analog voltage difference signal by a chip, an amplifier and a digital isolator, converting the analog signal into a digital signal and processing the digital signal for final data transmission.

According to the specific embodiments provided by the present disclosure, the present disclosure achieves the following technical effects:

The present disclosure provides the signal processing system and method for a radiation detector based on an MOS transistor. The positive high-voltage power supply generated by the classic nuclear electronic circuit is isolated from another power supply with a power isolation module, and an anode of the positive high-voltage power supply is connected to a cathode of the another power supply. The method not only solves problems of noise caused by use of a coupling capacitor for separating a positive high-voltage power supply from an output signal of a detector in the positive high-voltage power supply mode, baseline shift and so on, but also has the advantages of simple structure and low cost compared with other methods for generating the negative high-voltage circuit or power supply. The present disclosure abandons the method for processing the signal of the detector in the classic nuclear electronic circuit, and converts a current pulse signal of the detector into a voltage difference based on switching characteristics and capacitance characteristics of the MOS transistor, and digitalizes the signal for identification. By converting the signal into the voltage difference, the method simplifies the complicated signal processing (for example, a pre-amplifier circuit, a pole-zero cancellation circuit, a filter forming circuit and the like are required), and solves the problem of noise caused by introduction of an electronic element to a complicated signal processing circuit. The present disclosure uses the voltage difference to represent energy of ions in signal identification, rather than the voltage to represent energy of ions in the classic nuclear electronic circuit, thereby solving the ballistic deficit, statistical error and quantization error in the classic nuclear electronic circuit.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

FIG. 10 illustrates a flowchart of a working principle for processing a signal in a classic nuclear electronic circuit according to an embodiment of the present disclosure;

REFERENCE NUMERALS

Figure 1:
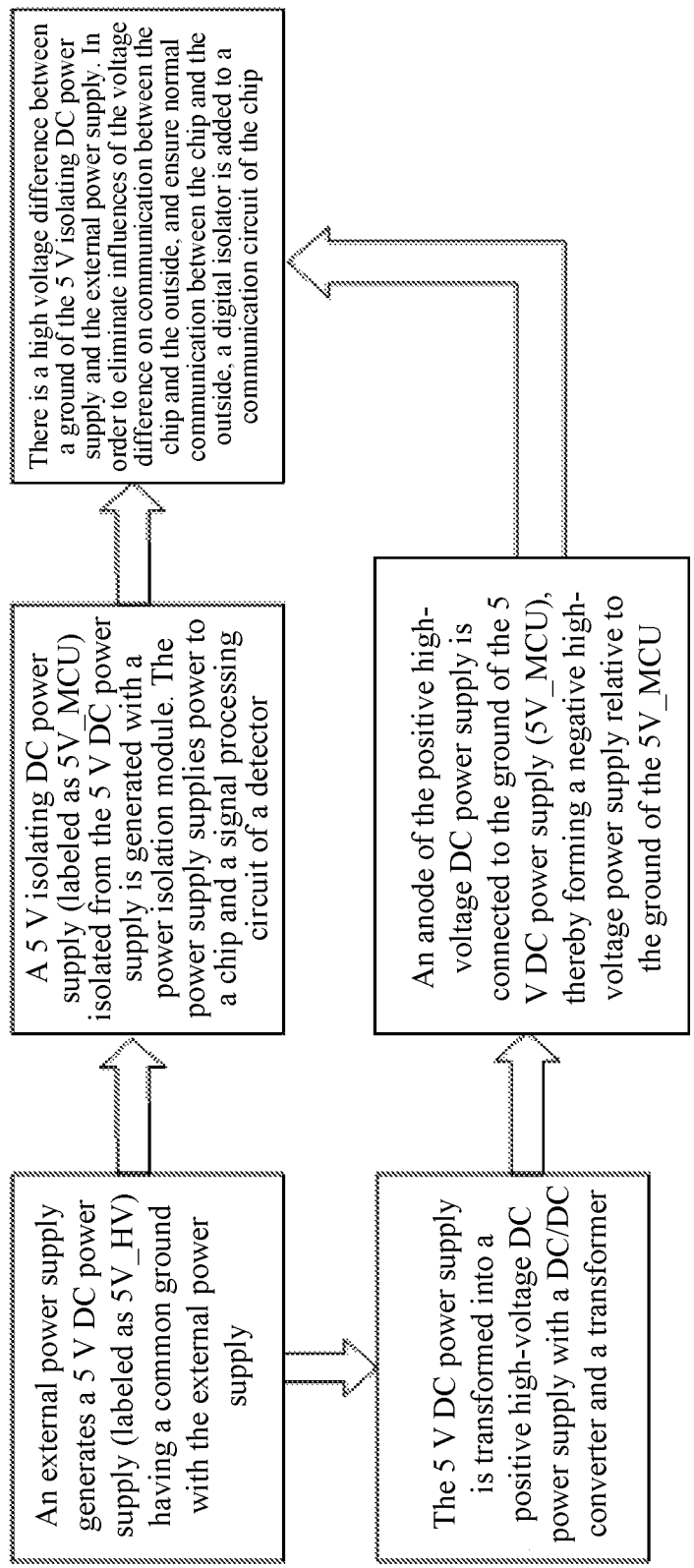
FIG. 1 is a flowchart for generating a negative high-voltage power supply of a system according to an embodiment of the present disclosure.
Figure 2:
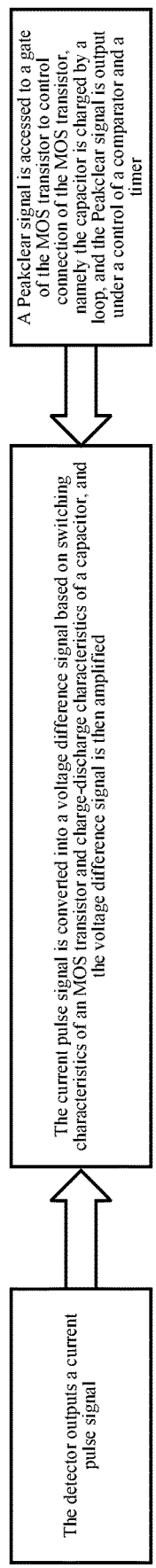
FIG. 2 is a flowchart for processing an analog signal of a system according to an embodiment of the present disclosure.
Figure 3:
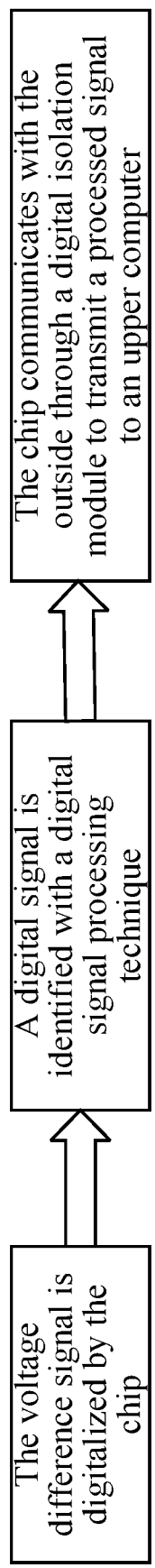
FIG. 3 is a flowchart for processing a digital signal of a system according to an embodiment of the present disclosure.

U1: second regulator, U2: chip, U4: digital isolator, U5: amplifier, U6: first regulator, J10: power isolation module, U11: fourth regulator, U12: third regulator, Q1: MOS transistor, C18: first capacitor, 5V_HV: first DC power supply, Vin_PRT: external power supply, 5V_MCU: first isolating DC power supply, VDDA: second modular power supply, and 3V3_MCU:

third modular power supply.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Reference throughout this specification to "embodiment" means that a particular feature, structure, or characteristic described in connection with the embodiment is included in at least one embodiment of the present disclosure. The appearances of the above phrase in various places in the specification are not necessarily all referring to the same embodiment, nor are separate or alternative embodiments mutually exclusive of other embodiments. It is explicitly and implicitly understood by those skilled in the art that the embodiment described herein can be combined with other embodiments.

In the specification, claims, and accompanying drawings of the present disclosure, the terms "first", "second", "third", "fourth" and so on are intended to distinguish between different objects but do not indicate a particular order. In addition, terms "including" and "having", and any variants thereof are intended to cover non-exclusive inclusion. For example, a process or method including a series of steps is not limited to the listed steps, and optionally, may further include a step that is not listed, or optionally, may further include other steps inherent to the process, method, product, or device.

An objective of the present disclosure is to provide a signal processing system and method for a radiation detector based on an MOS transistor. The present disclosure solves problems of noise caused by use of a coupling capacitor for separating a positive high-voltage power supply from an output signal of a detector in the positive high-voltage power supply mode, baseline shift, and noise caused by introduction of an electronic element to a complicated signal processing circuit.

To make the above-mentioned objective, features, and advantages of the present disclosure clearer and more comprehensible, the present disclosure will be further described in detail below in conjunction with the accompanying drawings and specific embodiments.

As shown in FIGS. 1-12, the present disclosure provides a signal processing system for a radiation detector based on an MOS transistor, including a PMT, a power supply generation module, an analog signal processing module, and a digital signal acquiring-processing module.

The PMT includes a cathode K, an anode P, dynodes, and a voltage-divider circuit.

The power supply generation module includes an external power supply, a first regulator, a second regulator, a third regulator, a fourth regulator, a booster circuit, a shaping filter circuit, and a power isolation module.

The external power supply is connected to the first regulator, and regulated by the first regulator to obtain a first DC voltage power supply.

The first DC voltage power supply is connected to the second regulator, and regulated by the second regulator to obtain a second DC voltage power supply.

The first DC voltage power supply is connected to the power isolation module, to generate a first isolating DC voltage power supply.

The first isolating DC voltage power supply is connected to the third regulator, and regulated by the third regulator to obtain a second modular power supply. The second modular power supply supplies power to the analog signal processing module.

The first isolating DC voltage power supply is connected to the fourth regulator, and regulated by the fourth regulator to obtain a third modular power supply. The third modular power supply supplies power to the digital signal acquiring-processing module.

The first DC voltage power supply passes through the booster circuit and the shaping filter circuit to generate a positive high-voltage power supply.

An anode of the positive high-voltage power supply generated by the first DC voltage power supply is connected to a ground of the first isolating DC voltage power supply, to convert the positive high-voltage power supply into a negative high-voltage power supply.

The negative high-voltage power supply is connected to a last dynode DY8 of the PMT, to provide a voltage required by the dynode. A ground of the first DC voltage power supply is connected to the cathode K of the PMT.

The power isolation module includes a power isolator.

The power isolator is configured to isolate a ground of a 5 V DC power supply and a ground of a 5 V isolating DC power supply.

Figure 5:
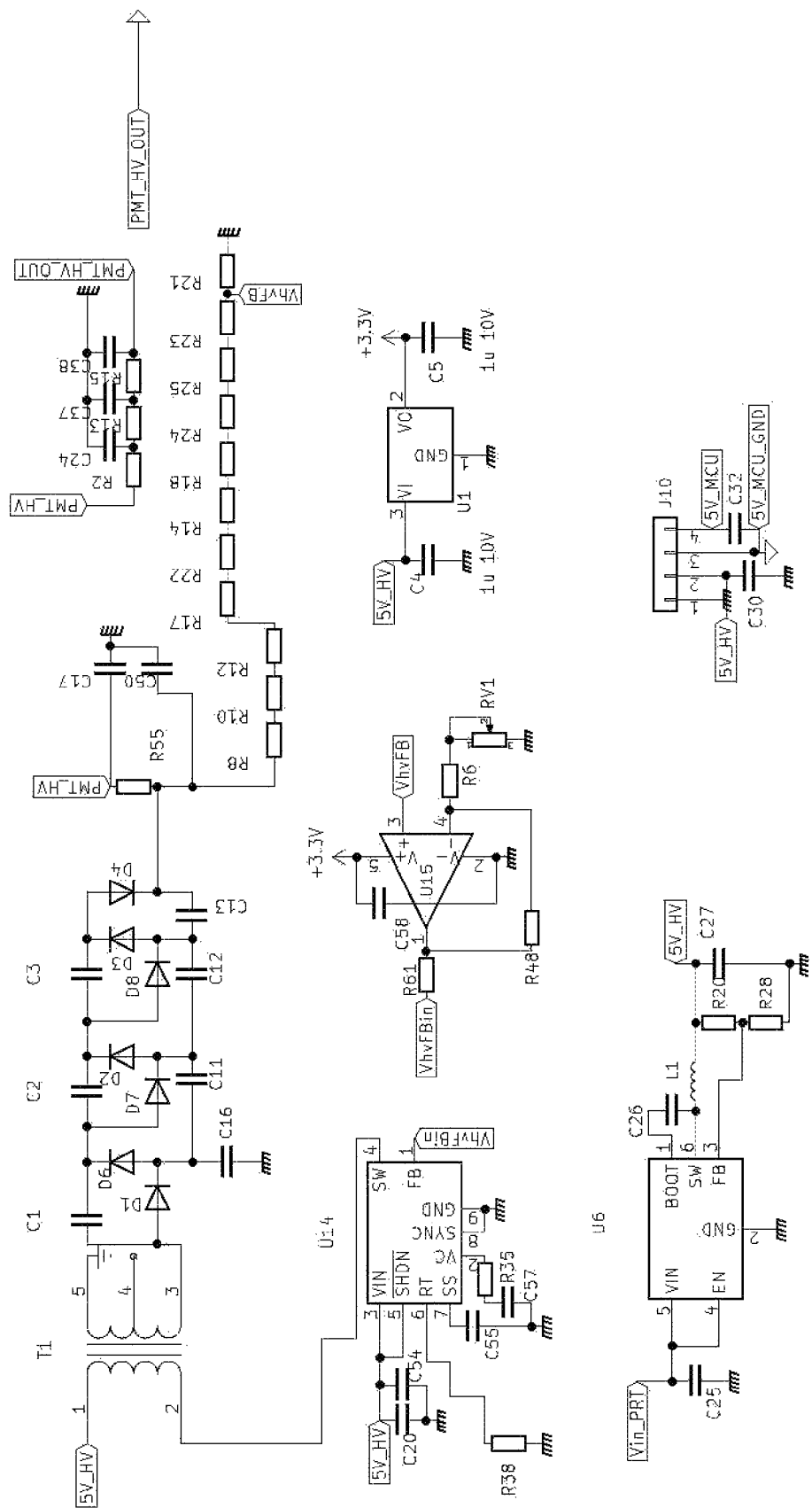
FIG. 5 illustrates a circuit structure of a voltage module of a system according to an embodiment of the present disclosure.

Specifically, as shown in FIG. 5, the 5 V DC power supply (5V_HV) is generated by connecting an anode of the external power supply Vin_PRT to the regulator U6. The 5 V DC power supply (5V_HV) is connected to the power isolation module J10, with a ground connected to a first pin of the J10, and an anode connected to a second pin of the J10. A capacitor is serially connected between a point where the anode of the power supply is connected to the second pin of the J10 and the ground of the power supply. The 5V isolating DC power supply (5V_MCU) is generated between a third pin and a fourth pin of the J10, in which the third pin serves as a ground of the 5V isolating DC power supply (5V_MCU), and the fourth pin serves as an anode of the 5V isolating DC power supply (5V_MCU). A capacitor is serially connected between the third pin and the fourth pin. An anode PMT_HV_OUT of the positive high-voltage power supply obtained by passing the 5 V DC power supply (5V_HV) through the booster circuit is connected to the ground of the 5V isolating DC power supply (5V_MCU), such that the positive high-voltage power supply is converted into the negative high-voltage power supply. The 5 V DC power supply (5V_HV) includes the anode connected to an eighth pin of the digital isolator U4, and the ground connected to a fifth pin of the digital isolator U4. At the power supply circuit, a novel negative voltage generation mode is provided for the system through the power isolator. Features of the method include the following. The 5V isolating DC power supply (5V_MCU) isolated from the positive high-voltage DC power supply is generated with the power isolator. The anode of the positive high-voltage DC power supply is connected to the ground of the 5V isolating DC power supply (5V_MCU), such that the positive high-voltage power supply is converted into the negative high-voltage power supply. Meanwhile, influences on communication between the system and the outside in connection of the ground of the 5 V DC power supply to the positive high-voltage DC power supply are eliminated with the digital isolator.

The analog signal processing module includes an MOS transistor, a first capacitor, and an amplifier.

The MOS transistor Q1 includes a second pin connected to an anode of the power supply VDDA, and a third pin connected to the amplifier. The first capacitor is connected between the second pin and the third pin of the MOS transistor Q1 in parallel. A negative current pulse signal is accessed to the third pin of the MOS transistor Q1. The PeakClear output signal is accessed to a first pin of the MOS transistor Q1 to control connection of the MOS transistor Q1 so as to charge the first capacitor.

The first capacitor is charged under control of the MOS transistor Q1, and is discharged through the negative current pulse signal to obtain a voltage drop, thereby obtaining a voltage difference signal. The voltage difference signal is amplified by the amplifier.

Figure 7:
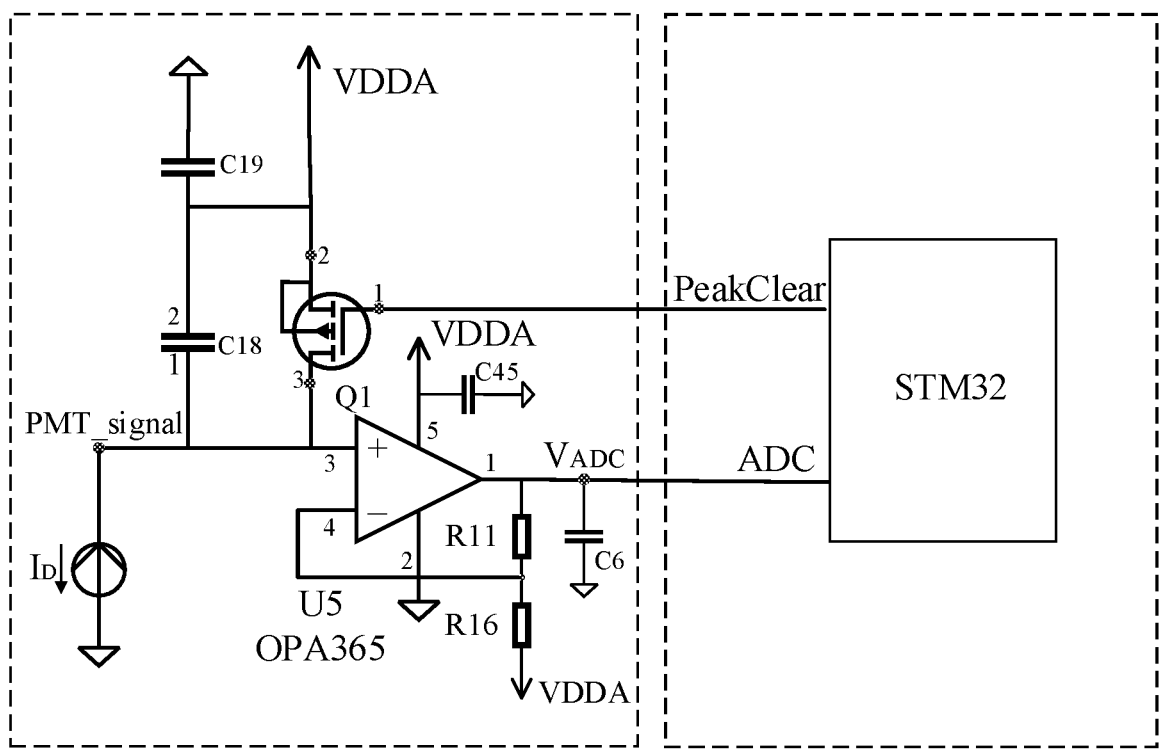
FIG. 7 illustrates a structure of an analog signal processing circuit of a system according to an embodiment of the present disclosure.
Figure 8:
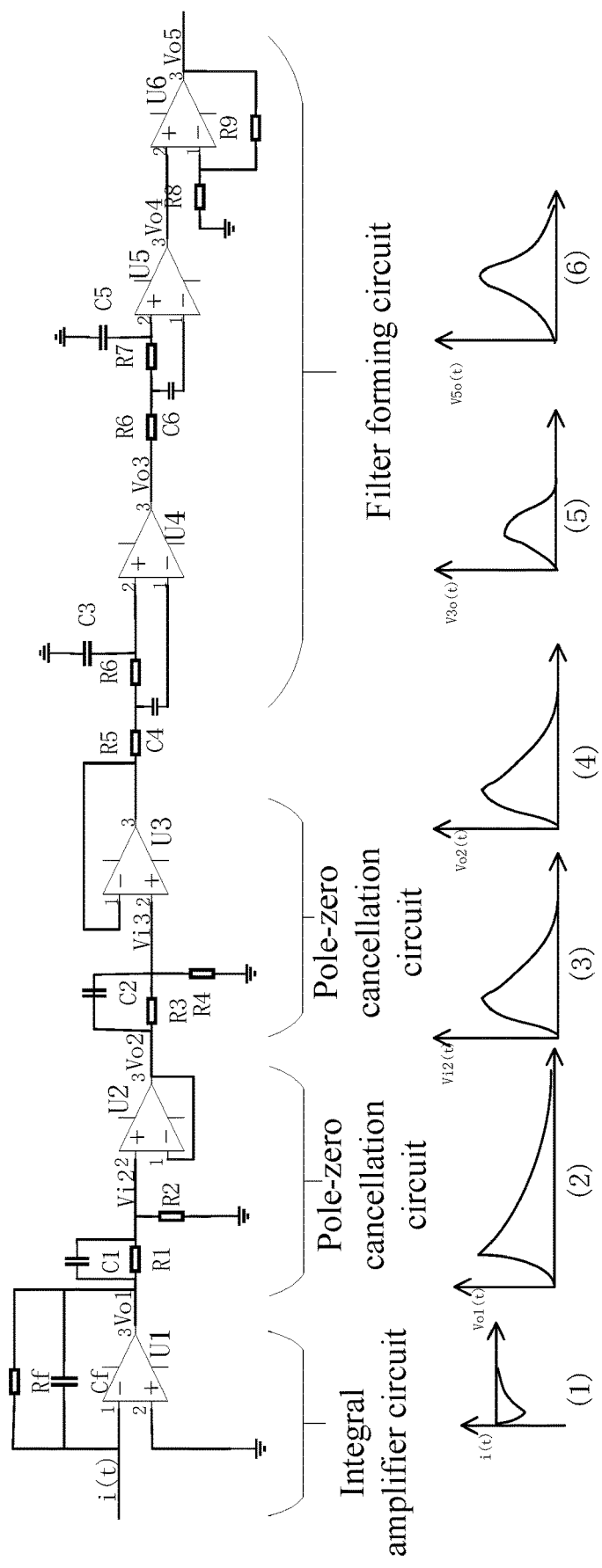
FIG. 8 illustrates a structure of a signal processing circuit in a classic nuclear electronic circuit according to an embodiment of the present disclosure.
Figure 9:
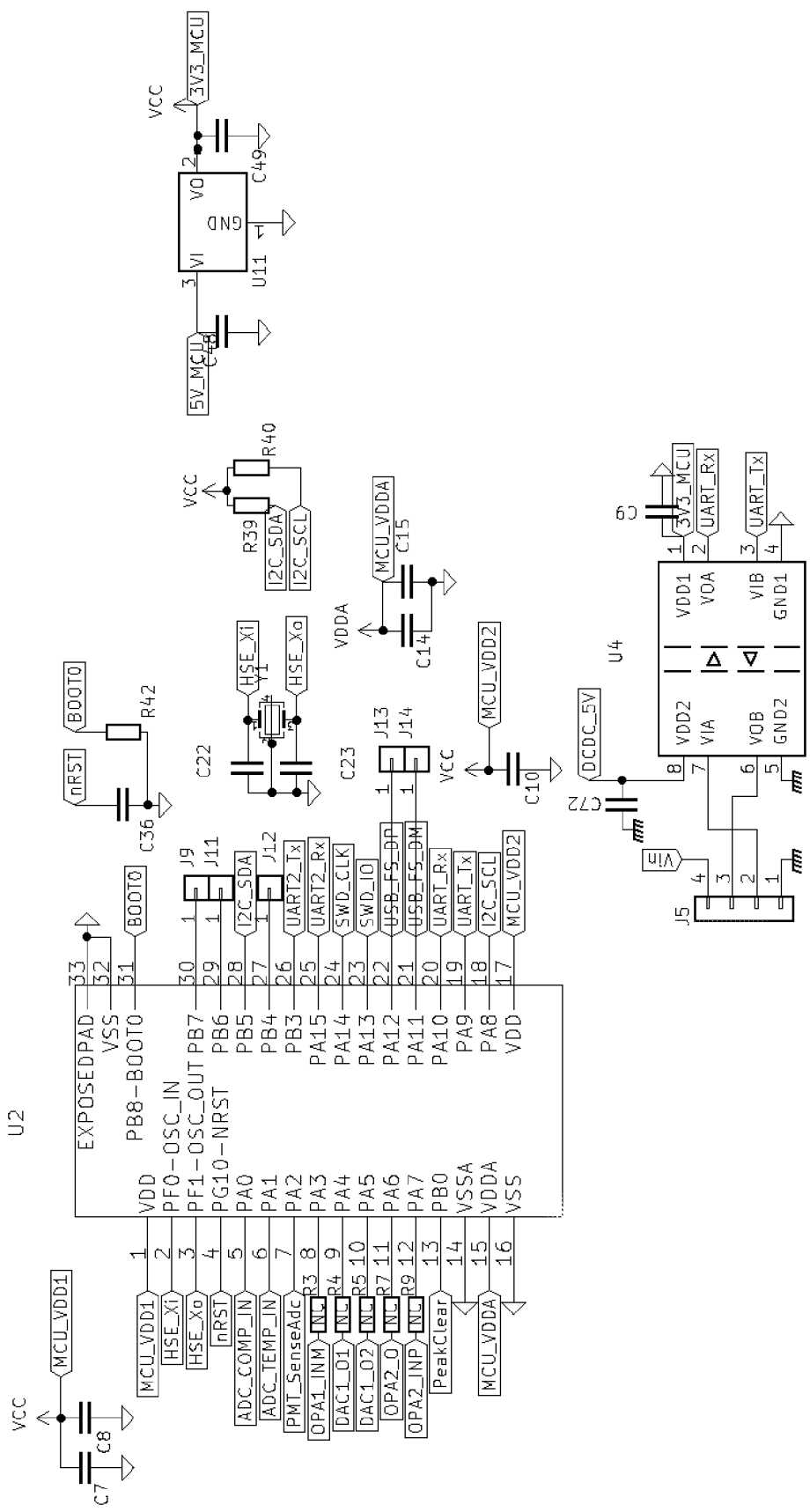
FIG. 9 illustrates a structure of a digital signal processing circuit of a system according to an embodiment of the present disclosure.
Figure 11:
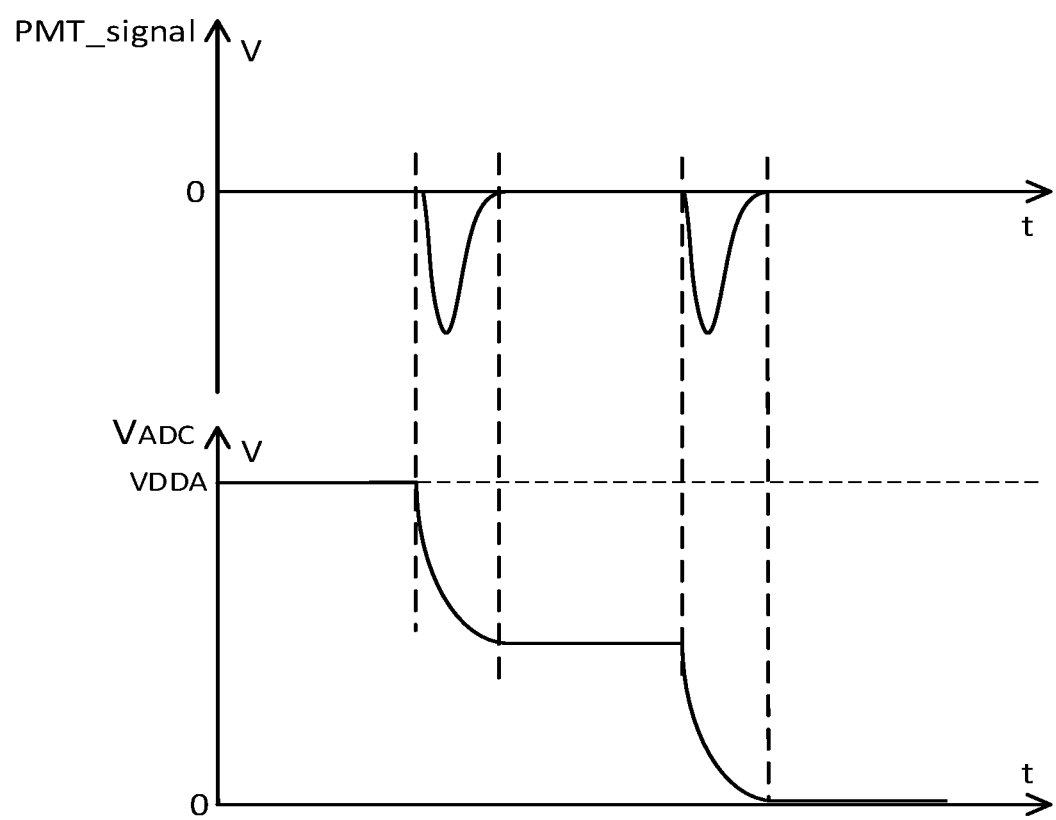
FIG. 11 illustrates a waveform of a negative charge output signal of a detector and a signal of an integrating capacitor according to an embodiment of the present disclosure.
Figure 12:
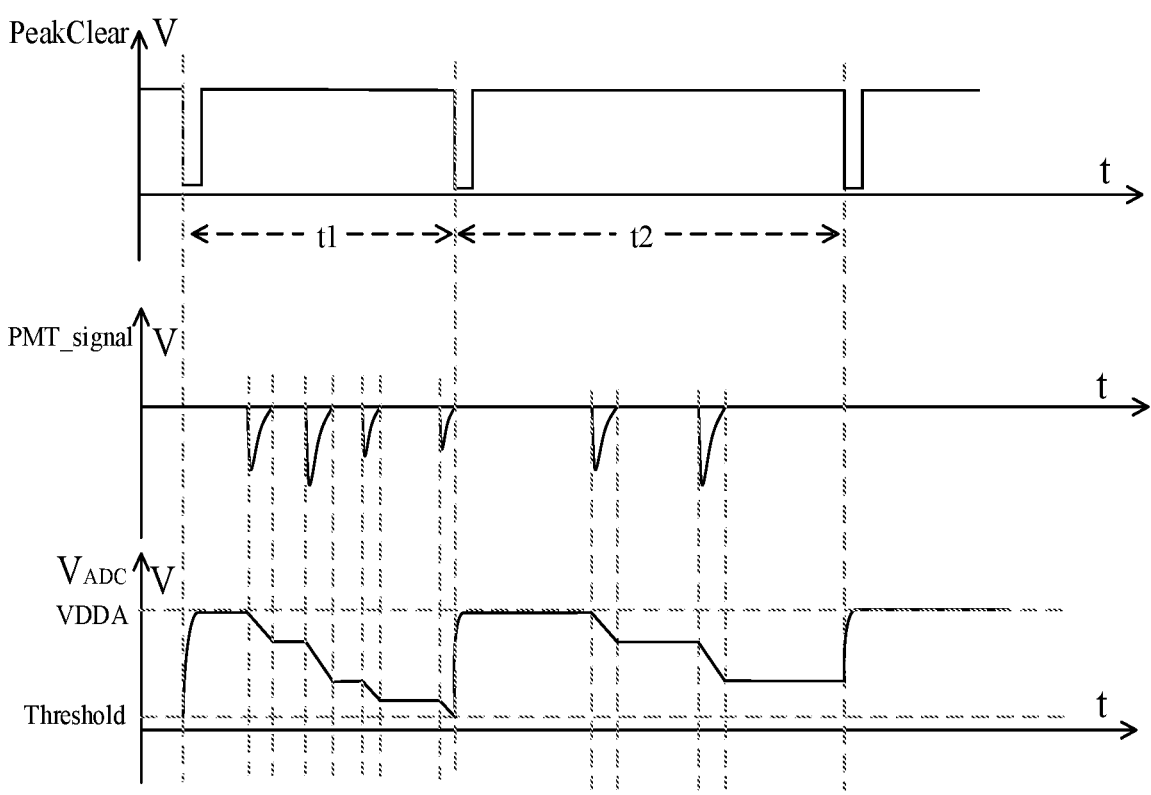
FIG. 12 illustrates a waveform of a PeakClear signal, a negative charge output signal of a detector and a signal of an integrating capacitor according to an embodiment of the present disclosure.

Specifically, as shown in FIG. 7, Q1 refers to the MOS transistor. The Q1 includes a first pin connected to a thirteenth pin of the U2, and the second pin connected to the anode of the power supply VDDA. A capacitor C19 is connected between the second pin of the Q1 and the ground of the VDDA. The third pin of the Q1 is connected to a third pin of the U5. The first capacitor is connected between the second pin and the third pin of the Q1 in parallel. The negative current pulse signal PMT_signal from the detector is accessed to the third pin of the Q1. A first pin of the U5 is connected to a fifth pin of the U2. Resistors R11 and R16 are serially connected to the circuit to determine an amplification factor of the amplifier. During an integrating process of negative charges from the detector on the first integrating capacitor, an integrated voltage on the capacitor cannot be accumulated unlimitedly for a breakdown voltage of the capacitor. The analog signal processing circuit of the system is implemented based on charge-discharge characteristics of the capacitor. When the negative current pulse signal from the detector passes through the capacitor, a corresponding quantity of electric charges will be lost from the capacitor. Negative charges from the detector are integrated on the first integrating capacitor to generate the negative voltage, thereby reducing the voltage on the first integrating capacitor, namely the negative charges are converted into a changing voltage signal on the integrating capacitor C18. Whenever the negative current pulse signal is converted into the voltage difference signal, a corresponding quantity of electric charges will be lost from the capacitor. In order to maintain a sufficient quantity of electric charges on the capacitor all the time, the first integrating capacitor is charged by the power supply VDDA based on switching characteristics of the MOS transistor Q1. As a result, the voltage of the first integrating capacitor is the same as that of the VDDA to restore the quantity of electric charges on the capacitor. As shown in FIG. 9, PeakClear is a signal controlled and output by a chip. The PeakClear is accessed to a thirteenth pin of the chip. There are a threshold and a fixed time period t2 that are set artificially. The thirteenth pin of the chip outputs the negative rectangular pulse signal PeakClear, which includes two cases: The chip generates the negative rectangular pulse signal PeakClear when the voltage on the first integrating capacitor amplified by the operational amplifier U5 is less than the threshold within the time period t2. On the other hand, the chip also generates the negative rectangular pulse signal PeakClear when the voltage on the first integrating capacitor amplified by the operational amplifier U5 is greater than the threshold within the time period t2, until the time interval is the same as the t2. With the negative rectangular pulse signal PeakClear, the MOS transistor is connected, and the voltage of the first integrating capacitor is the same as that of the VDDA. ADC_COMP_IN refers to a signal obtained after the voltage signal on the first integrating capacitor is amplified by the operational amplifier U5. The ADC_COMP_IN is accessed to a fifth pin of the chip. The chip performs analog-to-digital conversion on the ADC_COMP_IN, and processes a converted digital signal. Meanwhile, according to the converted digital signal and corresponding time, the chip determines the two cases where the thirteenth pin of the chip outputs the negative rectangular pulse signal PeakClear in the above step, and determines whether to output the negative rectangular pulse signal through the thirteenth pin to charge the first integrating capacitor.

The digital signal acquiring-processing module includes a chip U2 and a digital isolator.

The chip is connected to the amplifier and the digital isolator, and configured to acquire an analog voltage difference signal, convert the analog signal into a digital signal, and process the digital signal for final data transmission.

Further, second and third pins of the digital isolator are respectively connected to twentieth and nineteenth pins of the chip.

The digital isolator includes an eighth pin connected to the first DC voltage power supply, a first pin connected to the third modular power supply, a fifth pin connected to the ground of the first DC voltage power supply, and a fourth pin connected to the ground of the first isolating DC voltage power supply, and configured to isolate the ground of the first DC voltage power supply and the ground of the first isolating DC voltage power supply to facilitate the stable data transmission.

Specifically, as shown in FIG. 9, the 5V isolating DC power supply (5V_MCU) is connected to the regulator U11 to generate the power supply 3V3_MCU, which supplies power to the module herein. The first pin of the Q1 is connected to the thirteenth pin of the U2. The first pin of the U5 is connected to the fifth pin of the U2. An eighth pin of the U4 is connected to the anode of the 5 V DC power supply (5V_HV), and connected to the ground of the 5 V DC power supply (5V_HV) through a capacitor C72. The fifth pin of the U4 is connected to the ground of the 5 V DC power supply (5V_HV). The first pin of the U4 is connected to the anode of the power supply 3V3_MCU, and connected to the ground of the power supply 3V3_MCU through a capacitor C9. The U4 includes a second pin connected to a twentieth pin of the U2, a third pin connected to a nineteenth pin of the U2, and a fourth pin connected to the ground of the power supply 3V3_MCU. The digital signal processing circuit of the system digitalizes the signal with the U2, and processes the digital signal with a digital signal processing technique. The system communicates with the outside through the U4 to transmit a processed signal.

Further, the booster circuit includes a transformer and a converter.

Both the transformer and the converter are connected to the first DC voltage power supply, and configured to convert and boost the first DC voltage power supply.

The transformer has a model of Z2w, while the converter has a model of LT3580.

Further, the second modular power supply supplies power to the analog signal processing module.

The third modular power supply is a 3V3 power supply, and supplies power to the digital signal acquiring-processing module.

Further, the digital isolator has a model of ADuM1201AR.

An embodiment further provides a signal processing method for a radiation detector based on an MOS transistor, including:

An external power supply is regulated by a first regulator to obtain a first voltage power supply.

The first DC voltage power supply is regulated by a second regulator to obtain a second DC voltage power supply.

The first DC voltage power supply is connected to a power isolation module to generate a first isolating DC voltage power supply.

The first isolating DC voltage power supply is regulated by a third regulator to obtain a second modular power supply.

The first isolating DC voltage power supply is regulated by a fourth regulator to obtain a third modular power supply.

The first DC voltage power supply passes through a booster circuit and a shaping filter circuit to generate a positive high-voltage power supply.

An anode of the positive high-voltage power supply generated by the first DC voltage power supply is connected to a ground of the first isolating DC voltage power supply, to convert the positive high-voltage power supply into a negative high-voltage power supply.

The negative high-voltage power supply is connected to a last dynode DY8 of a PMT, to provide a voltage required by the dynode.

A ground of a 5 V DC power supply and a ground of a 5 V isolating DC power supply are isolated by a power isolator.

A first capacitor is charged under control of an MOS transistor Q1, the first capacitor is discharged by passing different negative current pulse signals through the first capacitor to obtain a voltage drop, thereby obtaining a voltage difference signal, and the voltage difference is amplified to obtain an amplified voltage difference.

An analog voltage difference signal is acquired by a chip, an amplifier and a digital isolator, the analog signal is converted into a digital signal and the analog signal is processed for final data transmission.

Figure 4:
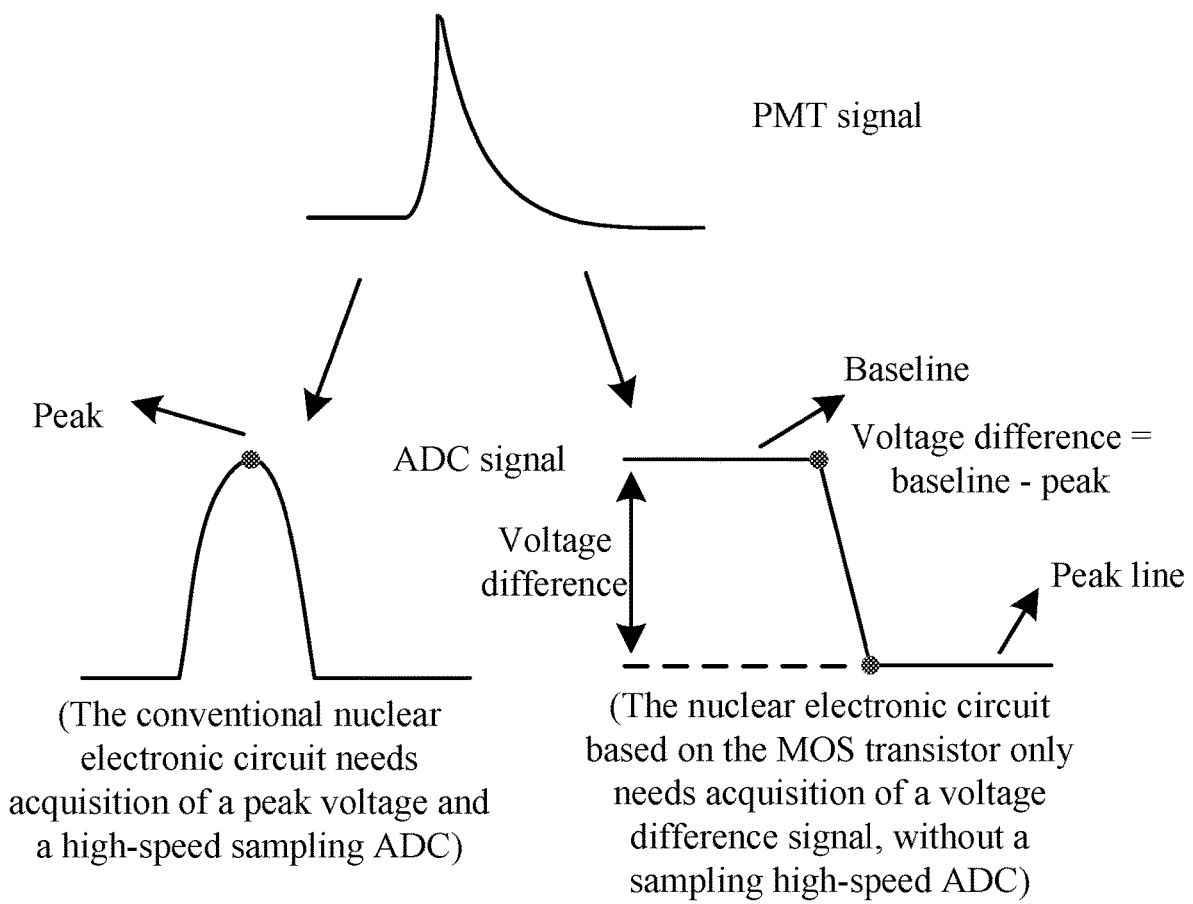
FIG. 4 is an improved comparative schematic view for processing a digital signal according to an embodiment of the present disclosure.

The negative current pulse signal is converted into the voltage difference signal through the switching characteristics of the MOS tube. As shown in FIG. 4, while a peak is extracted from the quasi-Gaussian signal in the conventional nuclear electronic circuit, a statistical error is introduced. While a digital signal in the quasi-Gaussian signal is processed, a quantization error is caused. Compared with the conventional nuclear electronic circuit, the nuclear electronic circuit based on the MOS tube processes the digital signal in the voltage difference signal (voltage difference=baseline-peak), thereby eliminating the statistical error and the quantization error.

Figure 6:
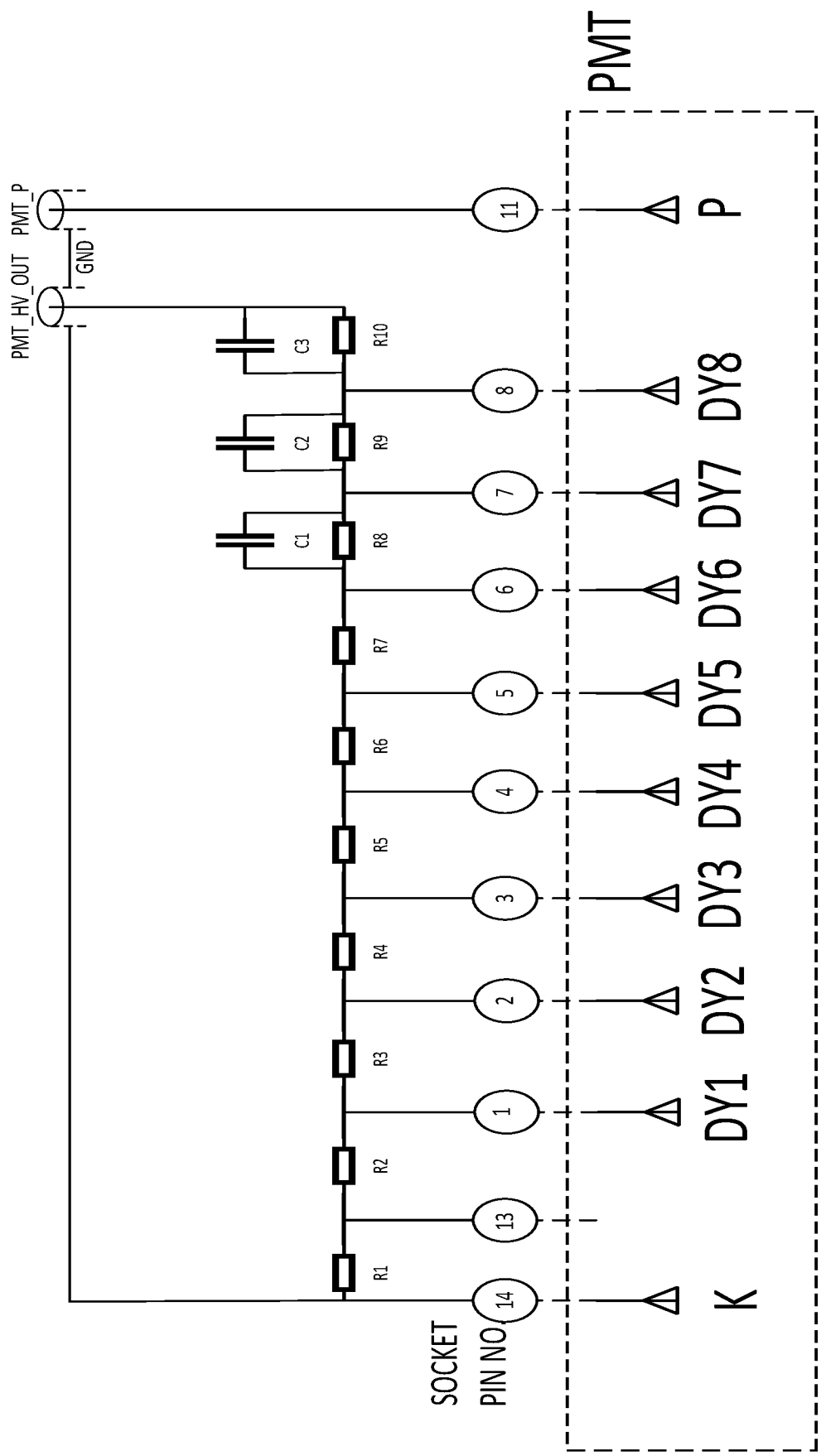
FIG. 6 illustrates a voltage-divider circuit and a signal output circuit of a PMT according to an embodiment of the present disclosure.

FIG. 6 illustrates a voltage-divider circuit and a signal output circuit of a PMT according to an embodiment of the present disclosure, which shows a relation between FIG. 5 and FIG. 7, and in which K is a cathode of the PMT, DY1 to DY8 are dynodes, and P is an anode. Grounds of PMT_HV_OUT and PMT_signal are connected together. Numerals 1, 2, 3 and the like are pins of the PMT. The PMT_HV_OUT provides a voltage for dynodes of the PMT through the voltage-divider circuit, and the PMT_signal is a signal output from the PMT.

Specifically, the working process of the system is shown in FIGS. 1-4. At the power supply circuit, the external power supply is transformed into the 5 V DC power supply through a regulator circuit. The 5 V DC power supply is transformed into the positive high-voltage power supply through the booster circuit. The 5 V DC power supply passes through the power isolation module to generate the 5 V isolating DC power supply. The anode of the positive high-voltage power supply is connected to the ground of the 5 V isolating DC power supply, such that the positive high-voltage power supply is converted into the negative high-voltage power supply. The 5 V isolating DC power supply supplies power to an output signal processing circuit of the detector. At the output signal processing circuit of the detector, a signal of the detector is processed by the analog signal processing module, and a processed signal is then transmitted to the digital signal processing module for final processing. The power supply of the digital signal processing module and the 5 V DC power supply of the power supply circuit module are connected to the digital isolator, which ensures communication between the digital signal processing module and the outside.

Specifically: Step 1: The external power supply is transformed into a power supply required by the system. The external power supply Vin_PRT is transformed into the 5V_HV. The 5V_HV is transformed by the U1 into the 3.3 V DC voltage power supply. The transformer T1 boosts a variable voltage difference between a voltage obtained by performing conversion on the 5V_HV with the DC/DC converter U14 and the 5V_HV. Through a voltage multiplying rectifier circuit composed of a capacitor and a diode and a filter circuit composed of a capacitor and a resistor, the corresponding positive high-voltage power supply is obtained. The 5V_HV is connected to the power isolation module J10 to generate the isolated DC power supply 5V_MCU. The anode of the positive high-voltage power supply is connected to the ground of the 5V_MCU to form the negative high-voltage power supply, to which a probe of the detector is connected. The power supplies 5V_HV and 3.3 V have a common ground with the external power supply Vin_PRT, and are isolated from the 5V_MCU. The T1 has a model of Z2w, the U14 has a model of LT3580, J10 has a model of PDSE1-S5-S5, and U1 has a model of MCP1700-3002E. Step 2: The 5V_MCU is subjected to voltage reduction through the regulator U12 to obtain the power supply VDDA. The regulator U12 has a model of BU33TD3WG. The PeakClear is a signal sent from the chip to control on-off of the MOS transistor. The PMT_signal is a signal from the detector. The ADC_COMP_IN is a port to which the ADC of the chip is connected. The MOS transistor Q1 has a model of DMG2307L or DMG1013T.

Step 3: The 5V_MCU is transformed into the 3V3_MCU with the regulator U11. U4 is the digital isolation module. Since the power supply 5V_MCU of the chip is isolated from the outside, and the ground of the 5V_MCU is connected to the anode of the positive high-voltage power supply, the digital isolation module can realize electrical isolation of the system from an external device, and provides a secure channel for communication between the chip and the outside. Other parts are circuits for normal work of the chip. The ADC_COMP_IN is connected to the corresponding pin of the chip. The chip digitalizes the analog signal, processes the digital signal for identification, and transmits the identified signal to the upper computer. The U2 has a model of STM32G431, the U4 has a model of ADuM1201AR, and the regulator U11 has a model of MCP1700-3002E. The circuit in FIG. 5 provides a voltage for the system. The negative high-voltage power supply provides a working voltage for the PMT. Upon reception of the current pulse signal of the detector, the circuit in FIG. 7 converts the current pulse signal into the voltage difference signal according to the switching characteristics of the MOS transistor and the charge-discharge characteristics of the capacitor. The voltage difference signal is amplified by the amplifier.

The present disclosure has the following beneficial effects:

The present disclosure converts the positive high-voltage power supply into the negative high-voltage power supply, and uses the digital isolator to eliminate influences on the circuit caused by connection of the ground of the 5 V isolating DC power supply to the positive high-voltage power supply. The method provides a novel negative voltage generation mode for the nuclear electronic circuit with the power isolator.

By converting the negative current pulse signal from the detector into the voltage difference signal through a metal-oxide-semiconductor field effect transistor (MOSFET), the analog signal processing method in the system prevents ballistic deficit and such complicated processes as filtration and formation on the pulse signal, and baseline restoration, and reduces influences on the signal from the electronic element in the analog circuit.

The present disclosure can effectively identify the signal. By combining with the analog signal processing technique and the digital signal processing technique in the signal processing part, the system simplifies a hardware circuit, reduces a power, solves noise and other problems arising from the hardware circuit, and improves stability and anti-interference performance of the system.

Each embodiment of the present specification is described in a progressive manner, each embodiment focuses on the difference from other embodiment s, and the same and similar parts between the embodiment s may refer to each other.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. A signal processing system for a radiation detector based on a metal oxide semiconductor (MOS) transistor, comprising a photomultiplier tube (PMT), a power supply generation module, an analog signal processing module, and a digital signal acquiring-processing module, wherein:
   the PMT comprises a cathode K, an anode P, dynodes, and a voltage-divider circuit;
   the power supply generation module comprises an external power supply, a first regulator, a second regulator, a third regulator, a fourth regulator, a booster circuit, a shaping filter circuit, and a power isolation module;
   the external power supply is connected to the first regulator, and regulated by the first regulator to obtain a first direct-current (DC) voltage power supply;

the first DC voltage power supply is connected to the second regulator, and regulated by the second regulator to obtain a second DC voltage power supply;

the first DC voltage power supply is connected to the power isolation module, to generate a first isolating DC voltage power supply;

the first isolating DC voltage power supply is connected to the third regulator, and regulated by the third regulator to obtain a second modular power supply;

the first isolating DC voltage power supply is connected to the fourth regulator, and regulated by the fourth regulator to obtain a third modular power supply;

the first DC voltage power supply passes through the booster circuit and the shaping filter circuit to generate a positive high-voltage power supply;

an anode of the positive high-voltage power supply generated by the first DC voltage power supply is connected to a ground of the first isolating DC voltage power supply, to convert the positive high-voltage power supply into a negative high-voltage power supply;

the negative high-voltage power supply is connected to a last dynode DY8 of the PMT, to provide a voltage required by the dynode, and a ground of the first DC voltage power supply is connected to the cathode K of the PMT;

the power isolation module comprises a power isolator;

the power isolator is configured to isolate a ground of a 5 V DC power supply and a 5 V isolating DC power supply;

the analog signal processing module comprises a MOS transistor Q1, a first capacitor, and an amplifier;

the MOS transistor Q1 comprises a second pin connected to an anode of a power supply VDDA, and a third pin connected to the amplifier; the first capacitor is connected between the second pin and the third pin of the MOS transistor Q1 in parallel; and a negative current pulse signal is accessed to the third pin of the MOS transistor Q1;

the first capacitor is charged under control of the MOS transistor Q1; by passing different negative current pulse signals through the first capacitor, the first capacitor is discharged to obtain a voltage drop, thereby obtaining a voltage difference signal; and the voltage difference signal is amplified to obtain an amplified voltage difference;

the digital signal acquiring-processing module comprises a chip and a digital isolator; and the chip is connected to the amplifier and the digital isolator, and configured to acquire an analog voltage difference signal, convert the analog signal into a digital signal and process the digital signal for final data transmission.

2. The signal processing system for a radiation detector based on a MOS transistor according to claim 1, wherein the chip comprises a PeakClear output signal; and the PeakClear output signal is accessed to a thirteenth pin of the chip; and the PeakClear output signal is accessed to a first pin of the MOS transistor Q1 to control connection of the MOS transistor Q1 so as to charge the first capacitor.

3. The signal processing system for a radiation detector based on a MOS transistor according to claim 1, wherein second and third pins of the digital isolator are respectively connected to twentieth and nineteenth pins of the chip; and the digital isolator comprises an eighth pin connected to the first DC voltage power supply, a first pin connected to the third modular power supply, a fifth pin connected to the ground of the first DC voltage power supply, and a fourth pin connected to the ground of the first isolating DC voltage power supply, and is configured to isolate the ground of the first DC voltage power supply and the ground of the first isolating DC voltage power supply to facilitate the stable data transmission.

4. The signal processing system for a radiation detector based on a MOS transistor according to claim 1, wherein the booster circuit comprises a transformer and a converter; and both the transformer and the converter are connected to the first DC voltage power supply, and configured to convert and boost the first DC voltage power supply.

5. The signal processing system for a radiation detector based on a MOS transistor according to claim 1, wherein:

the second modular power supply supplies power to the analog signal processing module; and the third modular power supply is a 3V3 power supply, and supplies power to the digital signal acquiring-processing module.

6. A signal processing method for a radiation detector based on a metal oxide semiconductor (MOS) transistor, comprising:

regulating an external power supply by a first regulator to obtain a first direct-current (DC) voltage power supply;

regulating the first DC voltage power supply by a second regulator to obtain a second DC voltage power supply;

connecting the first DC voltage power supply to a power isolation module to generate a first isolating DC voltage power supply;

regulating the first isolating DC voltage power supply by a third regulator to obtain a second modular power supply;

regulating the first isolating DC voltage power supply by a fourth regulator to obtain a third modular power supply;

passing the first DC voltage power supply through a booster circuit and a shaping filter circuit to generate a positive high-voltage power supply;

connecting an anode of the positive high-voltage power supply generated by the first DC voltage power supply to a ground of the first isolating DC voltage power supply, to convert the positive high-voltage power supply into a negative high-voltage power supply;

connecting the negative high-voltage power supply to a last dynode of a photomultiplier tube (PMT), to provide a voltage required by the dynode;

isolating a ground of a 5 V DC power supply and a ground of a 5 V isolating DC power supply by a power isolator;

charging a first capacitor under control of a MOS transistor Q1, discharging the first capacitor by passing different negative current pulse signals through the first capacitor to obtain a voltage drop, thereby obtaining a voltage difference signal, and amplifying the voltage difference signal to obtain an amplified voltage difference; and acquiring an analog voltage difference signal by a chip, an amplifier and a digital isolator, converting the analog signal into a digital signal and processing the digital signal for final data transmission.

* * * * *